US007802463B2

(12) United States Patent
Inoue et al.

(10) Patent No.: US 7,802,463 B2
(45) Date of Patent: Sep. 28, 2010

(54) SENSOR CONTROL DEVICE AND AIR FUEL RATIO DETECTING APPARATUS

(75) Inventors: Yoshinori Inoue, Aichi (JP); Hiroshi Inagaki, Aichi (JP); Norikazu Ieda, Aichi (JP); Keigo Banno, Aichi (JP)

(73) Assignee: NGK Spark Plug Co., Ltd., Aichi (JP)

(*) Notice: Subject to any disclaimer, the term of this patent is extended or adjusted under 35 U.S.C. 154(b) by 424 days.

(21) Appl. No.: 11/870,867

(22) Filed: Oct. 11, 2007

(65) Prior Publication Data

US 2009/0095052 A1 Apr. 16, 2009

(51) Int. Cl.
*G01N 27/407* (2006.01)
*F02D 41/02* (2006.01)

(52) U.S. Cl. ........................ 73/23.32; 123/694; 204/425

(58) Field of Classification Search ................ 73/23.32; 123/672; 204/425, 426
See application file for complete search history.

(56) References Cited

U.S. PATENT DOCUMENTS

| | | | | |
|---|---|---|---|---|
| 4,915,813 | A | 4/1990 | Nakajima et al. | |
| 5,475,339 | A * | 12/1995 | Maida | 327/561 |
| 5,778,855 | A * | 7/1998 | Czekala et al. | 123/406.27 |
| 5,810,997 | A | 9/1998 | Okazaki et al. | |
| 5,980,710 | A | 11/1999 | Kurokawa et al. | |
| 6,446,488 | B1 | 9/2002 | Kurokawa et al. | |
| 7,252,748 | B2 * | 8/2007 | Inoue et al. | 73/23.31 |
| 2004/0089545 | A1 | 5/2004 | Kawase et al. | |

FOREIGN PATENT DOCUMENTS

| | | | |
|---|---|---|---|
| JP | 62-18659 | U | 2/1987 |
| JP | 62-203056 | A | 9/1987 |
| JP | 1-152356 | | 6/1989 |
| JP | 9-61397 | A | 3/1997 |
| JP | 9-145671 | A | 6/1997 |
| JP | 2000-46791 | A | 2/2000 |
| JP | 3487159 | | 10/2003 |
| JP | 2004-205488 | | 7/2004 |
| JP | 2006275628 | A * | 10/2006 |

* cited by examiner

*Primary Examiner*—Lisa M Caputo
*Assistant Examiner*—Punam Roy
(74) *Attorney, Agent, or Firm*—Sughrue Mion, PLLC

(57) ABSTRACT

A gas sensor apparatus 3 in an air-fuel ratio detection system 1 includes a gas sensor element 4 which outputs a detection signal corresponding to air-fuel ratio, and a gas sensor control circuit 2 which includes a detection section 20 for outputting a first output signal VIP1, a second output signal VIP2, and a third output signal VIP3 in accordance with the detection signal. This detection section 20 outputs the first output signal VIP1 which changes in accordance with the air-fuel ratio at least within a wide first air-fuel ratio zone, the second output signal VIP2 which changes in accordance with the air-fuel ratio within a narrow zone in the vicinity of the stoichiometric ratio, and the third output signal VIP3 which changes in accordance with the air-fuel ratio within a narrow zone in the lean region.

9 Claims, 7 Drawing Sheets

SENSOR CONTROL DEVICE AND AIR FUEL RATIO DETECTING APPARATUS

BACKGROUND OF THE INVENTION

1. Field of the Invention

The present invention relates to a sensor control apparatus for controlling a gas sensor element which outputs a detection signal that changes in accordance with air-fuel ratio while making use of exhaust gas of an internal combustion engine, and to an air-fuel ratio detection apparatus using the sensor control apparatus.

2. Description of the Related Art

In recent years, air-fuel ratio control of an internal combustion engine such as a gasoline engine has been performed by use of an air-fuel ratio control apparatus, which includes a gas sensor element capable of detecting, in a wide range, air-fuel ratio of a gas mixture taken into the engine, and a sensor control apparatus for controlling the element, in order to meet demand for enhancing control accuracy and demand for lean burn operation. Meanwhile, in order to cope with strengthened emission control of internal combustion engines and demand for further improved fuel consumption, there arises a strong demand for improving controllability in stoichiometric burn control in which air-fuel ratio is feedback-controlled in the vicinity of the stoichiometric air-fuel ratio, lean burn control in which air-fuel ratio is feedback-controlled in a predetermined lean region, or a like control.

Under such circumstances, Patent Documents 1 to 3 propose air-fuel-ratio control apparatuses each including a gas sensor element formed of a solid electrolyte body and outputting a detection signal which changes in accordance with air-fuel ratio.

Among these documents, Patent Document 1 discloses an air-fuel ratio detection apparatus which uses two differential amplifiers of different amplification factors; i.e., a differential amplifier whose amplification factor is 1 fold and a differential amplifier whose amplification factor is 5 fold, as amplification means for amplifying an output voltage corresponding to pump current flowing through an oxygen pump element, and which is configured such that when the air-fuel ratio is close to the stoichiometric air-fuel ratio (hereinafter may be simply referred to as "stoichiometric ratio"), an output from the differential amplifier of higher amplification factor is used, and when the air-fuel ratio is away from the stoichiometric ratio, an output from the differential amplifier of lower amplification factor is used. Thus, when the air-fuel ratio is close to the stoichiometric ratio, the air-fuel ratio can be detected more accurately.

Patent Document 2 discloses a gas concentration detection apparatus which similarly uses two amplifiers of different amplification factors; i.e., an amplifier whose amplification factor is 5 fold and an amplifier whose amplification factor is 15 fold, as amplification means for amplifying an output voltage of a current detection resistor connected to a sensor element, and which is configured such that when the air-fuel ratio is close to the stoichiometric ratio, an output from the amplifier of higher amplification factor is used, and when the air-fuel ratio is away from the stoichiometric ratio, an output from the amplifier of lower amplification factor is used. In this gas detection apparatus as well, when the air-fuel ratio is close to the stoichiometric ratio, the air-fuel ratio can be detected more accurately.

Patent Document 3 discloses a gas concentration detection apparatus which includes a current detection resistor for detecting the value of current flowing through a gas concentration sensor, and voltage signal output means for outputting this current value as a voltage signal, and which also includes a switch circuit for switching the resistance of the current detection resistor in accordance with the current value.

[Patent Document 1] Japanese Patent Application Laid-Open (kokai) No. H1-152356

[Patent Document 2] Japanese Patent Application Laid-Open (kokai) No. 2004-205488

[Patent Document 3] Japanese Patent No. 3487159

3. Problems to be Solved by the Invention

However, according to the techniques disclosed in Patent Documents 1 and 2, there must be prepared amplifiers which are equal in number to desired amplification factors, and therefore, the sensor control apparatus becomes expensive.

Meanwhile, according to the technique disclosed in Patent Document 3, since a voltage signal is obtained while the resistance of the current detection resistor is switched, a signal of an appropriate magnitude is difficult to obtain.

Further, there is a demand for a control apparatus for a gas sensor element which can output three types of signals; i.e., a signal suitable for performing lean burn control, a signal suitable for performing stoichiometric burn control, and a signal which can be detected as an air-fuel ratio in a wide range from a rich region to a lean region.

SUMMARY OF THE INVENTION

The present invention has been accomplished in view of the above-mentioned problems, and an object of the present invention is to provide a sensor control apparatus for controlling a gas sensor element which outputs a detection signal that changes in accordance with air-fuel ratio while making use of exhaust gas of an internal combustion engine, the sensor control apparatus being inexpensive and capable of outputting the detection signal at a proper signal level in both wide and narrow air-fuel-ratio ranges. Another object of the present invention is to provide a sensor control apparatus which can detect air-fuel ratio in a wide range from a rich region to a lean region and can accurately detect air-fuel ratio in a narrow range in the vicinity of the stoichiometric ratio and a narrow range in a lean region. Still another object of the present invention is to provide an air-fuel ratio detection apparatus using such a sensor control apparatus.

Means for solution is a sensor control apparatus for controlling a gas sensor element which outputs a detection signal that changes in accordance with air-fuel ratio while making use of exhaust gas of an internal combustion engine, the sensor control apparatus comprising an amplification circuit which can be selectively brought into a first state and a second state through switching of a gain of the amplification circuit. In the first state, the amplification circuit amplifies the detection signal with a relatively small gain and outputs a first output signal which changes in accordance with the detection signal corresponding to an air-fuel ratio within a relatively wide first air-fuel ratio zone. In the second state, the amplification circuit amplifies the detection signal with a relatively large gain and outputs a second output signal which changes in accordance with the detection signal corresponding to an air-fuel ratio within a relatively narrow second air-fuel ratio zone contained in the first air-fuel ratio zone.

In the sensor control apparatus of the present invention, through switching of gain, the amplification circuit can be selectively brought into the first state in which the amplification circuit amplifies the detection signal with a small gain and outputs a first output signal corresponding to the detection signal corresponding to an air-fuel ratio within the first air-fuel ratio zone, and the second state in which the amplification circuit amplifies the detection signal with a large gain and outputs a second output signal corresponding to the detection signal corresponding to an air-fuel ratio within the second air-fuel ratio zone contained in the first air-fuel ratio zone.

As described above, in the sensor control apparatus of the present invention, since the first and second output signals can be obtained from a single amplification circuit through switching of gain, the number of amplification circuits can be reduced, whereby a sensor control apparatus which is simple in configuration and is inexpensive can be obtained.

Further, since an amplification circuit is provided, gain and offset voltage can be properly selected, whereby the first and second output signals can have proper magnitudes. For example, the entire air-fuel ratio range in which the gas sensor element can detect air-fuel ratio can be set as the first air-fuel ratio zone, and an arbitrarily selected portion of the air-fuel ratio range (e.g., a range in the vicinity of the stoichiometric ratio, or a predetermined range in the lean region) can be set as the second air-fuel ratio zone.

Notably, gain refers to the ratio of the magnitude of an output signal (output voltage or output power) to the magnitude of an input signal (input voltage or input power). Further, offset voltage refers to a voltage added to the output voltage in order to shift the voltage value of the output signal. For example, when the input signal is zero, the voltage value of the output signal becomes equal to the voltage value of the offset voltage. Accordingly, the input signal and the output signal have a relation such that the output signal (voltage value)=input signal (voltage value)*gain+offset voltage. Further, the amplification circuit may perform not only non-inverted amplification but also inverted amplification. Further, the gain may be greater than 1, equal to 1 (buffer), or less than 1.

Examples of the gas sensor element, which outputs a detection signal that changes in accordance with air-fuel ratio, include a layered-type gas sensor element including at least a pump cell and an electromotive force cell, and a one-cell-type gas sensor element which is controlled in a so-called limiting current scheme.

Preferably, the sensor control apparatus comprises a current detection resistor which has a predetermined resistance and detects current flowing through the gas sensor element, wherein a voltage generated across the current detection resistor is used as the detection signal.

In a conventional sensor control apparatus, a current detection resistor is provided so as to detect current flowing through a gas sensor element. When the resistance of this current detection resistor is switched, the voltage (voltage drop, potential difference) appearing across the resistor changes. Accordingly, when this voltage is used as the detection signal (output voltage) of the gas sensor element, the relation (gradient) between the output voltage and the current flowing through the gas sensor element can be changed through switching of the current detection resistor.

However, when the sensor control apparatus is configured such that the resistance of the current detection resistor is switched, a long period of time is required for the output voltage to become stable after the switching. Further, since not only the current detection resistor but also the resistance (contract resistance, etc.) of a switch for the switching is present in a path for detecting the current flowing through the gas sensor element, the resistance of this path becomes likely to be instable.

In contrast, in the sensor control apparatus of the present invention, a current detection resistor of a predetermined resistance is provided, a voltage generated across the current detection resistor is amplified as the detection signal, and the gain of the amplification circuit is switched. Therefore, the current flowing through the gas sensor element flows through the current detection resistor which always has the predetermined resistance, whereby the output signal can be stabilized within a short period of time. Further, since the resistance of a switch is not present in series with the current detection resistor, the resistance of the path for detecting the current flowing through the gas sensor element does not become instable.

Notably, an arbitrary method may be employed for switching of the gain. For example, the sensor control apparatus is configured to change the resistance of a feedback resistor interposed between the output terminal and the input terminal (inverted input terminal) of an amplification circuit using an operational amplifier.

Further, in the sensor control apparatus, preferably, the gas sensor element includes an electromotive force cell, and a pump cell which is layered on the electromotive force cell via a measurement chamber into which the exhaust gas can be introduced, the pump cell pumping out and in oxygen within the measurement chamber in accordance with pump current, wherein the pump current supplied to the pump cell via the current detection resistor is controlled such that a predetermined voltage is generated at the electromotive force cell.

When a gas sensor element of a type which includes a pump cell and an electromotive force cell is used, there is employed a sensor control apparatus which is configured to control the pump current supplied to the pump cell via the current detection resistor such that a predetermined voltage is generated at the electromotive force cell. For example, through PID control, the pump current supplied to the pump cell via the current detection resistor is controlled such that the voltage generated at the electromotive force cell becomes constant. Thus, the magnitude of the pump current can be obtained by detecting, as a detection signal, a voltage generated across the current detection resistor.

However, in the sensor control apparatus of such a type in particular, since the current detection resistor is present in the path through which the pump current flows, when the current detection resistor is switched, the state of the path for supplying the pump current changes suddenly in a period in which the current is made constant by means of PID control or the like. Therefore, a long period of time is required for the control to become stable after the switching.

In contrast, in the sensor control apparatus of the present invention, a current detection resistor of a predetermined resistance is provided, and a voltage generated across the current detection resistor is used as the detection signal. Therefore, even in the case where the pump current flowing through the pump cell is controlled by means of, for example, PID control, the state of the current path does not change suddenly, which sudden change would otherwise occur due to switching of the current detection resistor, whereby proper control of the pump current can be continued.

In the above-described sensor control apparatus, preferably, the amplification circuit is a differential amplification circuit which performs differential amplification of potentials at opposite ends of the current detection resistor.

In the sensor control apparatus of the present invention, since the amplification circuit is a differential amplification circuit which performs differential amplification of potentials at opposite ends of the current detection resistor, removal of external noise is easy, whereby the detection signal can be amplified more properly so as to obtain proper first and second output signals.

In the above-described sensor control apparatus, preferably, the amplification circuit is configured to obtain an output by use of a rail-to-rail type operational amplifier.

In the sensor control apparatus of the present invention, the amplification circuit obtains an output by use of a rail-to-rail type operational amplifier which has a wider output voltage range as compared with an ordinary operational amplifier (more specifically, has a wide input voltage range and an output amplitude or range reaching a power source voltage). Therefore, the amplification circuit can output the first and second output signals changing in accordance with the detection signal of the gas sensor element, while amplifying the detection signal with a larger gain as compared with the case where an ordinary operational amplifier is used, or while amplifying the detection signal in a wider detection range when the amplification circuit has the same amplification characteristic as in the case where an ordinary operational amplifier is used.

The rail-to-rail type operational amplifier is an operational amplifier which has a wider output range (amplitude) as compared with an ordinary operational amplifier. An example of the rail-to-rail type operational amplifier is an operational amplifier having a circuit configuration in which transistors at the output stage are driven with a power supply voltage higher than that supplied to the remaining circuit, whereby a higher output voltage can be obtained.

Another means for solution is a sensor control apparatus for controlling a gas sensor element which outputs a detection signal that changes in accordance with air-fuel ratio while making use of exhaust gas of an internal combustion engine. As ranges for air-fuel ratio, first, second, and third zones are defined. The first zone ranges from a first lower limit within a rich region to a first upper limit in a lean region. The second zone ranges from a second lower limit in the rich region, the second lower limit being located between the first lower limit and a stoichiometric air-fuel ratio, to a second upper limit in the lean region, the second upper limit being located between the first upper limit and the stoichiometric air-fuel ratio. The third zone ranges from a third lower limit in the lean region, the third lower limit being equal to the second upper limit or being located between the second upper limit and the stoichiometric air-fuel ratio, to a third upper limit between the second upper limit and the first upper limit. The sensor control apparatus comprises output means for outputting first, second, and third output signals. The first output signal changes in accordance with the detection signal corresponding to an air-fuel ratio at least within the first range. The second output signal changes in accordance with the detection signal corresponding to an air-fuel ratio at least within the second range, the second output signal changing to a greater degree than the first output signal in response to a change in the detection signal. The third output signal changes in accordance with the detection signal corresponding to an air-fuel ratio at least within the third range, the third output signal changing to a greater degree than the first output signal in response to a change in the detection signal.

In the sensor control apparatus of the present invention, a first output signal corresponding to air-fuel ratio can be obtained in at least the relatively wide first zone ranging from the first lower limit within the rich region to the first upper limit in the lean region. Further, a second output signal corresponding to air-fuel ratio can be obtained in at least the second zone which is located in the vicinity of the stoichiometric air-fuel ratio (stoichiometric ratio) and which is narrower than the first zone. Moreover, a third output signal corresponding to air-fuel ratio can be obtained in at least the third zone which ranges from the third lower limit in the lean region, the third lower limit being equal to the second upper limit or being located on the stoichiometric ratio side thereof to the third upper limit and which is narrower than the first zone.

Since the zones in which the first, second, and third output signals can be obtained have the above-described relation, from the first output signal, air-fuel ratio can be properly detected in a wide air-fuel ratio range (first zone) ranging from the rich region to the lean region. In addition, from the second output signal, air-fuel ratio can be properly detected in a narrow range (second zone) in the vicinity of the stoichiometric ratio. Further, from the third output signal, air-fuel ratio can be properly detected in a narrow range (third zone) in the lean region.

As described above, the second zone and the third zone form a continuous range (when the second upper limit is equal to the third lower limit) or partially overlap (when the third lower limit is located between the second upper limit and the stoichiometric ratio). Accordingly, at least within an air-fuel ratio range ranging from the second lower limit to the third upper limit, air-fuel ratio can be detected seamlessly from at least one of the second and third output signals.

In addition, the second and third output signals change to a greater degree than the first output signal in response to a change in the detection signal. Accordingly, in the case of the second and third output signals, a large output change can be obtained even when the detection signal output from the gas sensor element changes slightly stemming from a slight change in air-fuel ratio. Therefore, for example, use of the second output signal allows for more accurate detection of air-fuel ratio within the second zone as compared with the case where the first output signal is used. Similarly, use of the third output signal allows for more accurate detection of air-fuel ratio within the third zone as compared with the case where the first output signal is used. In addition, as described above, use of the first output signal allows for detection of air-fuel ratio within the first zone, which is a wide range ranging from the rich region to the lean region. That is, it becomes possible to accurately detect air-fuel ratio by use of the gas sensor element in the entirety of a wide range.

Since the sensor control apparatus of the present invention can detect air-fuel ratio within a wide range ranging from the rich region to the lean region, it can be used for burn control in a wide range; e.g., burn control in the rich region during heavy load operation. In addition, air-fuel ratio can also be detected in a narrow range around the stoichiometric ratio and a narrow range in the lean region. Moreover, through use of this sensor control apparatus only, not only the wide range burn control of an internal combustion engine, but also stoichiometric burn control and lean control can be properly performed.

Notably, no limitation is imposed on the output means, so long as it has a configuration for outputting the first, second, and third output signals which change in accordance with the detection signal output from the gas sensor element. Examples of the output means include an amplification circuit formed by use of discrete components such as bipolar transistors, MOS transistors, and resistors; and an amplification circuit formed by use of an operational amplifier. The amplification circuit including an operational amplifier is preferable because, setting of gain, setting of offset voltage, and formation of a negative feedback circuit can be readily performed.

Preferably, in the sensor control apparatus, the output means includes first and second amplification circuits. The first amplification circuit is selectively brought into one of a first state in which the first amplification circuit amplifies the detection signal with a first gain and outputs the first output signal and a third state in which the first amplification circuit amplifies the detection signal with a third gain greater than the first gain and outputs the third output signal. The second amplification circuit amplifies the detection signal with a second gain greater than the first gain and outputs the second output signal.

The sensor control apparatus of the present invention includes not only the second amplification circuit which outputs the second output signal, but also the first amplification circuit which can be brought into the first state in which the first amplification circuit amplifies the detection signal with a first gain and outputs the first output signal or the third state in which the first amplification circuit amplifies the detection signal with a third gain and outputs the third output signal. By virtue of this configuration, the first and third output signals can be obtained. In addition, a common amplification circuit is used for obtaining these output signals, whereby the circuit configuration can be simplified, and the sensor control apparatus can be made less expensive. Further, the number of communication cables for connection with a control circuit (ECU) for controlling an internal combustion engine can be reduced.

An amplification circuit whose gain is set to a desired value may be used as the first and second amplification circuits. More preferably, an amplification circuit whose offset (e.g., offset voltage) is set to a desired value is used. A specific example is a negative feedback amplification circuit composed of an operational amplifier.

An example of the circuit configuration of the first amplification circuit which can be selectively brought into one of the first and third states is a circuit configuration which includes two amplifiers which differ in gain (more preferably, offset voltage as well) so as to obtain the first and third output signals, and an output switch circuit for selecting one of the first and third output signals in accordance with an instruction. In another example configuration, the gain (more preferably, offset voltage as well) of an amplification circuit can be switched by means of a switch.

In the above-described sensor control apparatus, preferably, the first amplification circuit comprises changeover means for switching the gain of the first amplification circuit itself to one of the first and third gains.

In the sensor control apparatus of the present invention, the first amplification circuit is selectively brought into one of the first and third states through switching of its gain performed by the changeover means. By virtue of this configuration, for obtainment of the first and third output signals, an amplification circuit using active element such as an operational amplifier or transistors can be shared, the sensor control apparatus can be made inexpensive. Further, since the circuit is simple, the circuit scale and power consumption of the sensor control apparatus can be reduced.

No limitation is imposed on the changeover means, so long as it is configured to switch the gain. For example, in the case where a negative feedback amplification circuit using an operational amplifier is used as the amplification circuit, the changeover means may be switch means for switching the resistance of the feedback resistor of the negative feedback amplification circuit.

In the above-described sensor control apparatus, preferably, at least one of the first and second amplification circuits is configured such that the output is obtained by use of a rail-to-rail operational amplifier.

In the sensor control apparatus of the present invention, at least one of the first and second amplification circuits is composed of a rail-to-rail operational amplifier having a wide output voltage range. Therefore, as compared with the case where an ordinary operational amplifier is used, the first output signal or second output signal, which changes in accordance with the detection signal of the gas sensor element, can be output in a wider detection range, even when an amplification circuit having the same amplification characteristic is used.

DESCRIPTION OF REFERENCE NUMERALS

Figure 1:
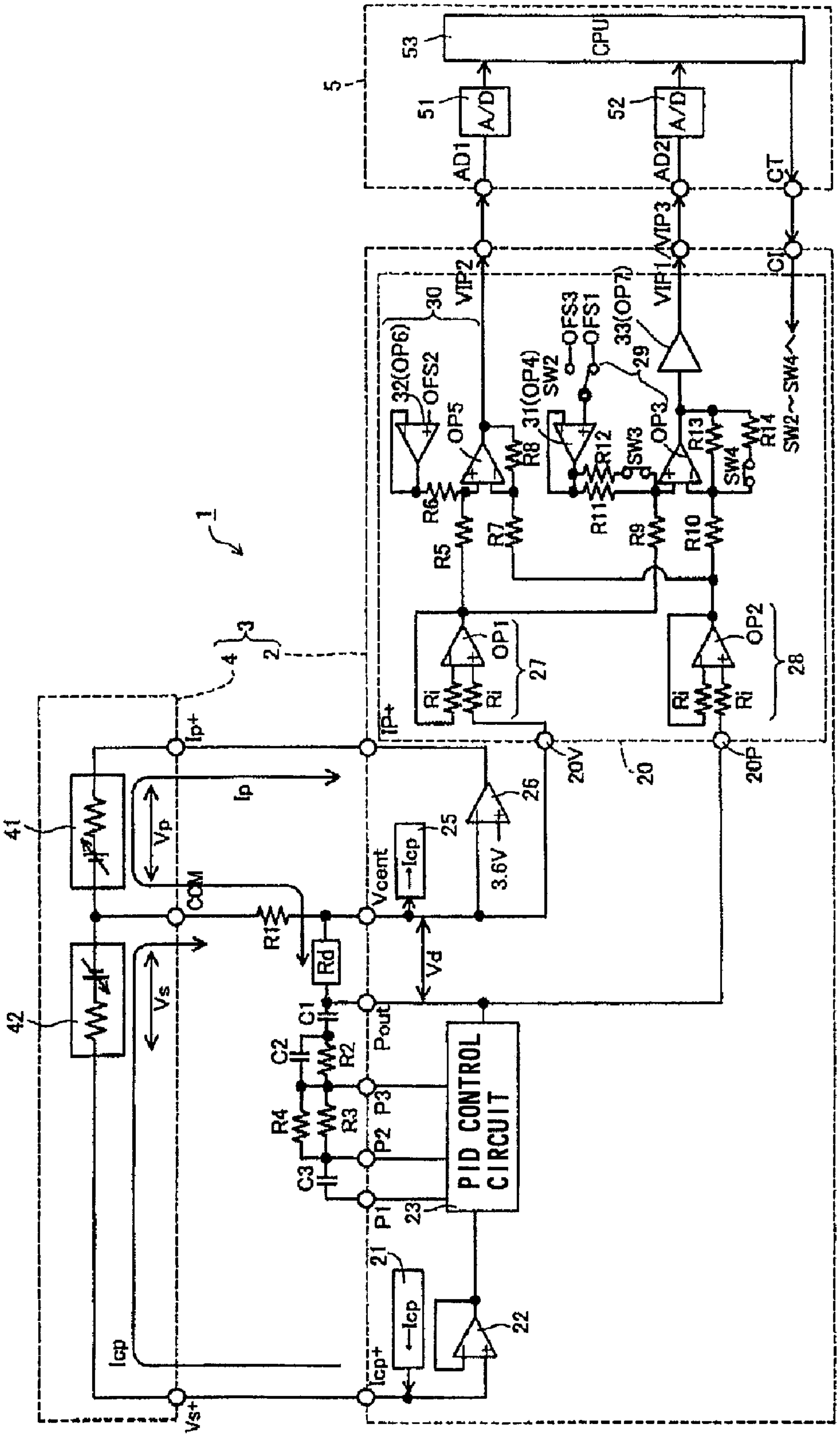
FIG. 1 is a circuit diagram for describing the circuit configuration of a gas sensor control circuit and an air-fuel ratio detection system according to Embodiment 1.

Reference numerals used to identify structural elements of the drawing include:

1, 100: air-fuel ratio detection system (air-fuel ratio detection apparatus)
2, 110: gas sensor control circuit (sensor control apparatus)
4, 120: gas sensor element
3, 130: gas sensor apparatus
20: detection section (output means)
OP1, OP2, OP3, OP4, OP5, OP6: operational amplifier
29: first amplification circuit
30: second amplification circuit
41: pump cell
42: electromotive force cell
200: (rail-to-rail type) operational amplifier
AF1L: first lower limit
AF1U: first upper limit
AF2L: second lower limit
AF2U: second upper limit
AF3L: third lower limit
AF3U: third upper limit
AFZ1: first air-fuel ratio zone
AFZ2: second air-fuel ratio zone
AFZ3: third air-fuel ratio zone
VAF1L: first lower limit voltage
VAF1U: first upper limit voltage VAF2L: second lower limit voltage
VAF2U: second upper limit voltage
VAF3L: third lower limit voltage
VAF3U: third upper limit voltage
G1: first gain
G2: second gain
G3: third gain
OFS1, OFS2, OFS3: offset voltage, reference potential
SW2: switch (offset changing means)
SW3, SW4: (changeover means)
VIP2: second output signal
VIP1-3: output signal of the first amplification circuit
VIP1: first output signal
VIP3: third output signal
Vd, Vd2: detection voltage (detection signal)

DETAILED DESCRIPTION OF THE REFERENCED EMBODIMENT

A sensor control apparatus according to the present invention and an air-fuel ratio detection apparatus using the same will now be described with reference to the drawings.

Embodiment 1

An air-fuel ratio detection system 1 according to a first embodiment of the present invention will be described with reference to FIGS. 1 to 5.

As shown in FIG. 1, the air-fuel ratio detection system 1, which detects air-fuel ratio from exhaust gas of a gasoline engine, includes a gas sensor apparatus 3 composed of a gas sensor element 4 and a gas sensor control circuit 2 which controls the gas sensor element 4 and outputs an output signal corresponding to the air-fuel ratio; and an engine control apparatus (hereinafter also referred to as ECU) 5 which obtains the air-fuel ratio on the basis of the output signal and controls the gasoline engine. The gas sensor control circuit 2 is connected to three terminals Vs+, COM, and IP+ of the gas sensor element 4, via respective terminals Icp+, Vcent, IP+. Further, the gas sensor control circuit 2 is connected to terminals AD1, AD2, and CT of the ECU 5 via respective terminals VIP2, VIP1/VIP3, and CI.

Figure 8:
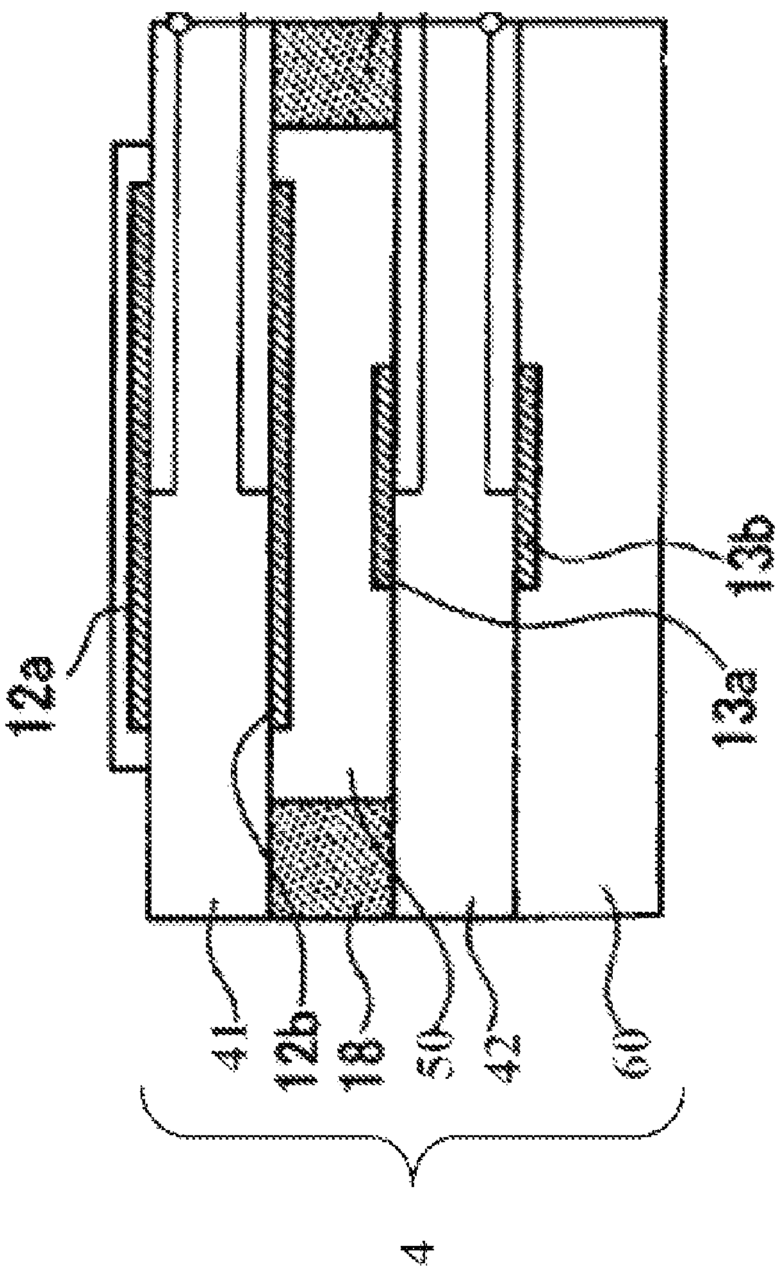
FIG. 8 is a schematic example showing a layered structure of a gas sensor element.

The gas sensor element 4 has a known structure, as example of which is shown in FIG. 8, in which a pump cell 41 and an electromotive force cell 42 are layered via a spacer that forms a hollow measurement chamber 50 into which exhaust gas can be introduced, and an electrode of the electromotive force cell 42 located opposite its side facing the measurement chamber is covered by a shielding layer. Each of the pump cell 41 and the electromotive force cell 42 includes, as a substrate, a plate-shaped solid electrolyte 60 having oxygen-ion conductivity, and porous platinum electrodes are formed on opposite sides of the substrate. A first electrode 12*b* (a left-hand electrode in FIG. 1) of the pump cell 41 and a first electrode 13*a* (a right-hand electrode in FIG. 1) of the electromotive force cell 42 communicate with each other, and are connected to the output terminal COM of the gas sensor element 4. Further, a second electrode 12*a* (a right-hand electrode in FIG. 1) of the pump cell 41 is connected to the output terminal Ip+of the gas sensor element 4, and a second electrode 13*b* (a left-hand electrode in FIG. 1) of the electromotive force cell 42 is connected to the terminal Vs+of the gas sensor element 4.

In this gas sensor apparatus 3, while a very small current Icp is supplied to the electromotive force cell 42 of the gas sensor element 4, pump current Ip flowing through the pump cell 41 is controlled such that a voltage Vs generated across the electromotive force cell 42 becomes 450 mV, whereby oxygen contained in exhaust gas introduced into the measurement chamber is pumped in or pumped out. Notably, since the magnitude and flow direction of the pump current Ip flowing through the pump cell 41 change depending on the air-fuel ratio (that is, oxygen concentration in exhaust gas), the air-fuel ratio (oxygen concentration in exhaust gas) can be detected through detection of the magnitude of the pump current Ip.

The ECU 5 includes A/D converters 51 and 52, and a CPU 53. The A/D converters 51 and 52 receive the output signals of the gas sensor control circuit 2 via the external input terminals AD1 and AD2 of the ECU 5, convert them into digital values, and output the digital values to the CPU 53. The CPU 53 calculates the air-fuel ratio on the basis of the digitized output signals of the gas sensor control circuit 2. Further, as will be described later, the ECU 5 turns on and off switches SW2 to SW4 contained in the gas sensor control circuit 2, in accordance with the calculated air-fuel ratio.

In addition to a control section for supplying the very small current Icp to the electromotive force cell 42 of the gas sensor element 4 and controlling the pump current Ip, the gas sensor control circuit 2 includes a detection resistor Rd which detects the magnitude of the pump current Ip and converts it to a detection voltage Vd, and a detection section 20 which detects and amplifies the detection voltage Vd generated by the detection resistor Rd.

The control section includes constant-current sources 21 and 25, an input buffer 22, an output buffer 26, and a PID control circuit 23. The constant-current source 21, the electromotive force cell 42, a resistor R1, and the constant-current source 25 are connected in this sequence so as to form a current path for supplying the very small current Icp. The PID control circuit 23 controls the magnitude of the pump current Ip through PID control such that a constant potential difference of 450 mV is produced between the potential at the terminal Vcent and the potential of the terminal Vs+ of the gas sensor element 4 (the Icp+ terminal of the gas sensor control circuit 2), which terminal is connected to the PID control circuit 23 via the input buffer 22. Further, capacitors C1 to C3 and resistors R2 to R4 for determining constants of the PID control are connected to terminals P1, P2, and Pout, which communicate with the PID control circuit 23.

Since the detection resistor Rd is disposed in the current path through which the pump current Ip flows, a detection voltage Vd (V) corresponding to the magnitude of the pump current Ip is generated across the detection resistor Rd. In the present Embodiment 1, since the resistance of the detection resistor Rd is set to 300Ω, the pump current Ip (A) can be obtained by an equation $Ip=Vd/300$. Further, the detection voltage Vd can be obtained from the difference between potential Vcent and potential Pout, where potential Vcent represents the potential at one end of the detection resistor Rd (potential at the terminal Vcent), and potential Pout represents the potential at the other end of the detection resistor Rd (potential at the terminal Pout).

Notably, in the present embodiment, the detection resistor Rd has a predetermined resistance (300Ω). In a sensor control circuit designed such that the resistance of a detection resistor is switched, every time the resistance of the detection resistor is switched, the state of a path through which pump current flows changes suddenly, and a long period of time is required for PID control to become stable, during which period the output obtained from the detection resistor Rd also becomes instable. In contrast, in the sensor control circuit of the present embodiment, as will be described later, the gain of an amplification circuit is changed rather than the resistance of the detection resistor Rd. Therefore, the resistance of the detection resistor Rd is fixed, whereby stable PID control of the pump current Ip becomes possible.

Meanwhile, the detection section 20 (output means) of the gas sensor control circuit 2 includes buffers 27 and 28, a first amplification circuit 29, and a second amplification circuit 30. The buffer 27 is composed of resistors Ri and an operational amplifier OP1, and the buffer 28 is composed of resistors Ri and an operational amplifier OP2. The second amplification circuit 30 is a differential-amplification-type negative feedback amplification circuit composed of an operational amplifier OP5, resistors R5 to R8, and a buffer 32. The buffer 32 is composed of an operational amplifier OP6. The first amplification circuit is a differential-amplification-type negative feedback amplification circuit composed of an operational amplifier OP3, resistors R9 to R14, the switches SW2, SW3, and SW4, and a buffer 31. The buffer 31 is composed of an operational amplifier OP4. The buffer 27 provides buffering operation for the potential Vcent received via an intermediate terminal 20V, and the buffer 28 provides buffering operation for the potential Pout received via an intermediate terminal 20P.

Next, the second amplification circuit 30 will be described. In the second amplification circuit 30, the potential Vcent is applied, via the buffer 27 and the resistor R5, to a non-inverted input terminal (+ terminal) of the operation amplifier OP5, and a reference potential OFS2 is applied to the non-inverted input terminal via the buffer 32 and the resistor R6. Meanwhile, the potential Pout is applied, via the buffer 28 and the resistor R7, to an inverted input terminal (– terminal) of the operation amplifier OP5, and the output of the second amplification circuit 30 itself is applied to the inverted input terminal via the resistor R8. Thus, the second amplification circuit 30 constitutes a differential-amplification-type negative feedback amplification circuit which has an offset voltage OFS2 and in which the resistor R8 serves as a feedback resistor. In the present Embodiment 1, since the second amplification circuit 30 is configured as a differential amplification circuit, noise commonly entering the two input terminals can be properly eliminated, so that a proper second output signal VIP2 including a reduced amount of noise can be obtained. Specifically, in the present Embodiment 1, R5 and R7 are set to 60 kΩ, R6 and R8 are set to 270 kΩ, and V1 is set to 2.3 V. Accordingly, the second amplification circuit 30 constitutes a differential amplification circuit which receives the detection voltage Vd as an input, amplifies it with a second gain G2 of 4.5 and a second offset voltage OFS2 of 2.3V, and outputs the second output signal VIP2. Further, since the resistance of the detection resistor Rd is 300Ω, the relation between the pump current Ip (A) and the second output signal VIP2 (V) is represented by the following equation.

$$VIP2=Ip\times300\times4.5+2.3 \qquad \text{Eq. (1)}$$

Figure 3:
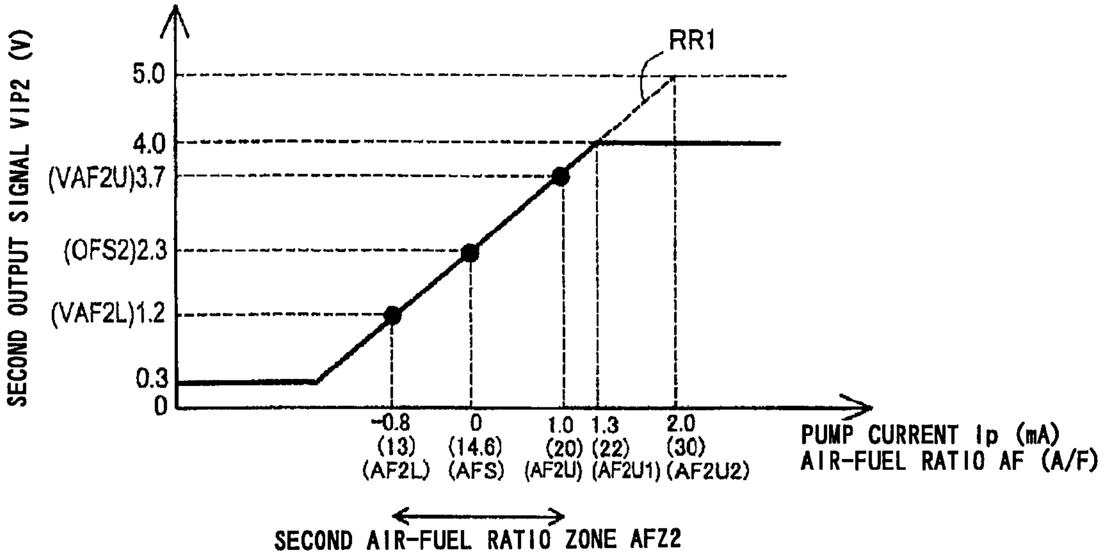
FIG. 3 is a graph relating to a second amplification circuit of an air-fuel ratio detection apparatus according to Embodiment 1, Modification 1 and Modification 2, and showing the relation between pump current Ip or air-fuel ratio AF and second output signal VIP2.

FIG. 3 shows the output characteristic of the second amplification circuit 30; i.e., the second output signal VIP2 which is determined on the basis of Eq. (1). In FIG. 3, the horizontal axis represents the pump current Ip (unit: mA) and air-fuel ratio AF (unit: A/F) corresponding thereto. The vertical axis represents the second output signal VIP2 (unit: V). In the air-fuel ratio detection system 1 (gas sensor apparatus 3) of Embodiment 1, control is performed such that a point at which the pump current Ip becomes 0 mA corresponds to the stoichiometric ratio (air-fuel ratio AF=14.6). In FIG. 3, the left side of the stoichiometric ratio is a rich region, and the right side thereof is a lean region.

An operational amplifier having an ordinary output-stage circuit configuration is used for the operational amplifier OP5 of the second amplification circuit 30. It is known that in such an operational amplifier, due to voltage drops of transistors at the final stage, the maximum output voltage becomes about 1.0 to 1.3 V lower than the power supply voltage, and the minimum output voltage becomes about 0.3 to 0.7 V higher than the ground potential. In the present embodiment, the operational amplifiers OP3 and OP5, which constitute the second amplification circuit 30 and the first amplification circuit 29, respectively, have an output voltage range of 0.3 to 4.0 V. Accordingly, the output voltage range of the second output signal VIP2 of the second amplification circuit 30 is limited to 0.3 to 4.0 V. Therefore, in the graph shown in FIG. 3, the second output signal VIP2 has a characteristic such that the second output signal VIP2 is clipped at 0.3 V, which is the minimum value of the output voltage, and at 4.0 V, which is the maximum value of the output voltage.

Notably, as shown in FIG. 3, when the pump current Ip is –0.8 mA corresponding to an air-fuel ratio AF=13, the second output signal VIP2 becomes 1.2 V. Further, when the pump current Ip is 1.0 mA corresponding to an air-fuel ratio AF=20, the second output signal VIP2 becomes 3.7 V. FIG. 3 shows that at least within a range in which the air-fuel ratio AF=13 to 20 (Ip=–0.8 to 1.0 mA), the second output signal VIP2 changes linearly with the pump current Ip. Therefore, use of this second amplification circuit 30 allows for obtainment of the second output signal VIP2 corresponding to air-fuel ratio AF within a range containing a second zone AFZ2, the lower limit (second lower limit AF2L) of which is an air-fuel ratio AF of 13 within the rich region corresponding to Ip=–0.8 mA and the upper limit (second upper limit AF2U) of which is an air-fuel ratio AF of 20 within the lean region corresponding to Ip=1.0 mA (see FIG. 3). It can be understood that use of the second amplification circuit 30 allows for obtainment of the second output signal VIP2 which changes with the air-fuel ratio at least within the second zone AFZ2.

The second output signal VIP2 obtained in the second amplification circuit 30 is output from the terminal VIP2 of the gas sensor control circuit 2 and then input to the terminal AD1 of the ECU 5, and is converted into a digital value by means of the A/D converter 51. The digital value is processed by means of the CPU 53, and is utilized for, for example, fuel control of the gasoline engine. Notably, in the present Embodiment 1, the second output signal VIP2 is always input to the ECU 5.

Next, the first amplification circuit 29 will be described. Like the second amplification circuit 30, the first amplification circuit 29 is a differential-amplification-type negative feedback amplification circuit using an operational amplifier. Accordingly, noise commonly entering the two input terminals of the first amplification circuit 30 can be properly eliminated, so that a proper first output signal VIP1 including a reduced amount of noise can be obtained. This is the same as in the case of the second amplification circuit 30. However, the first amplification circuit 29 differs from the second amplification circuit 30 in that the first amplification circuit 29 includes a circuit for switching the resistance by use of the switches SW2, etc. Hereinbelow, the first amplification circuit 29 and a circuit related thereto will be described in detail with reference to FIG. 2.

Figure 2:
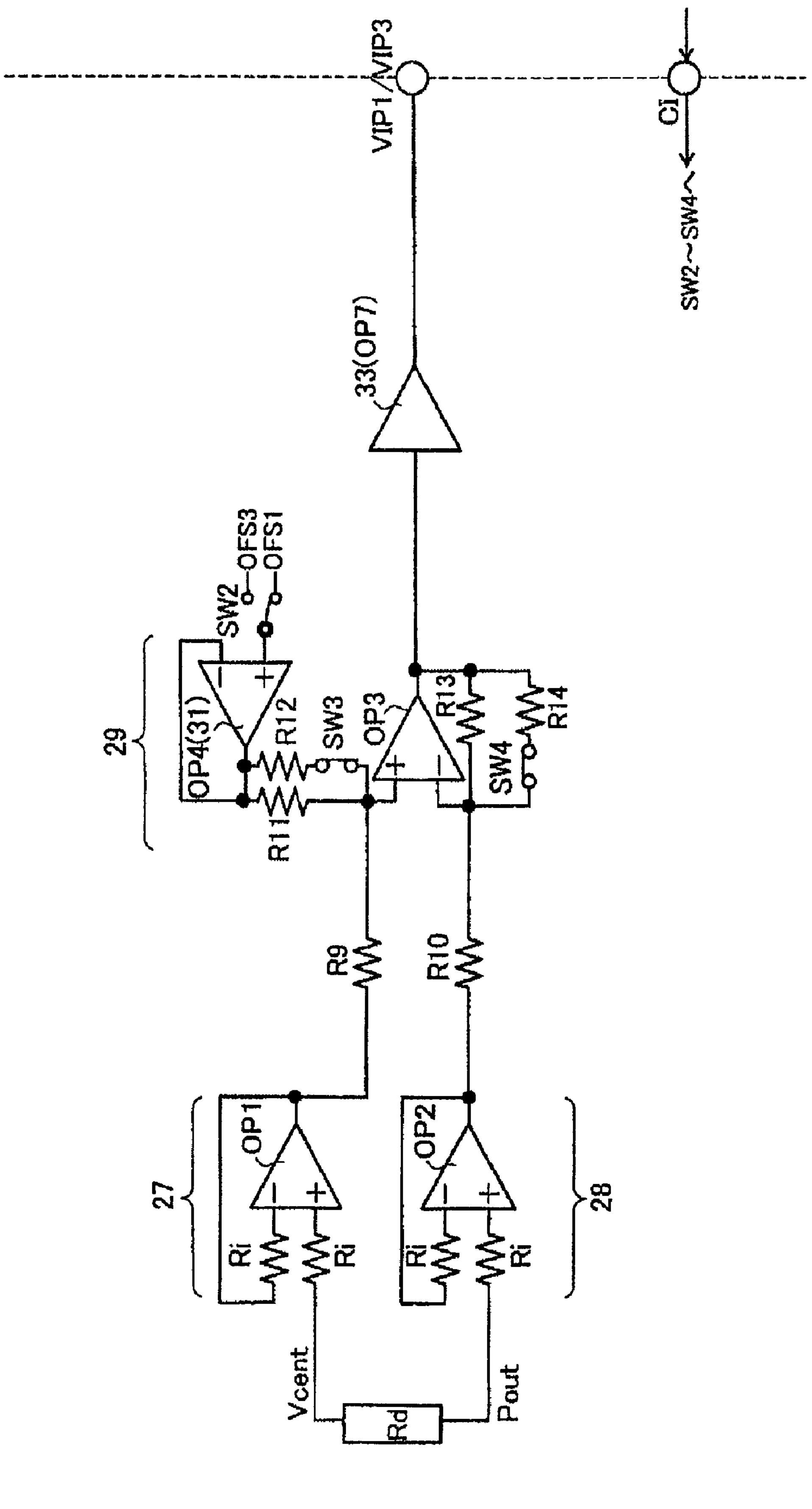
FIG. 2 is a circuit diagram for describing a first amplification circuit and portions related thereto, of the circuit configuration of the gas sensor control circuit according to Embodiment 1.

Of the components shown in FIG. 2, the buffers 27 and 28 have already been described. In the first amplification circuit 29, the potential Vcent is applied, via the buffer 27 and the resistor R9, to a non-inverted input terminal (+ terminal) of the operation amplifier OP3, and the output of the buffer 31 is applied to the non-inverted input terminal via the resistor R11. Notably, a circuit including the switch SW3 and the resistor R12 serially connected to each other is connected in parallel to the resistor R11. Therefore, through an operation of turning the switch SW3 on and off, the resistance between the non-inverted input terminal of the first amplification circuit 29 and the buffer 31 can be switched between the resistance of the resistor R11 and the composite resistance of the resistors R11 and R12 connected in parallel. Notably, the respective resistances of the resistors R11 and R12 are equal to those of the resistors R13 and R14, which will be described later (R11=R13, R12=R14). In this first amplification circuit 29, through switching of the resistance by means of the switch SW3, there is established matching between the impedance connected to the non-inverted input terminal + and the impedance connected to the inverted input terminal (− terminal) as will be described later.

The buffer 31 is composed of the operational amplifier OP4, and can receive, as an input, one of a reference potential OFS1 and a reference potential OFS3, which is selected by means of the switch SW2, and output the reference potential OFS1 or the reference potential OFS3, whichever is received as an input. This reference potential OFS1, OFS3 determines the offset voltage (first and third offset voltages OFS1 and OFS3) of the first amplification circuit 29. That is, in the first amplification circuit 29, the switch SW2 serves as an offset change means for selecting one of two offset voltages.

Meanwhile, the potential Pout is applied, via the buffer 28 and the resistor R10, to an inverted input terminal (− terminal) of the first amplification circuit 29, and the output of the first amplification circuit 29 itself is applied to the inverted input terminal via the resistor R13. Notably, a circuit including the switch SW4 and the resistor 14 serially connected to each other is connected in parallel to the resistor R13. Therefore, through an operation of turning the switch SW4 on and off, the resistance of the feedback resistor present between the inverted input terminal of the first amplification circuit 29 and the output of the first amplification circuit 29 itself can be switched between the resistance of the resistor R13 and the composite resistance of the resistors R13 and R14 connected in parallel. By virtue of this switching, the gain of the first amplification circuit 29 can be changed. That is, through synchronous switching of the switches SW3 and SW4, the gain can be switched to one of two gains, and these switches serve as a changeover means. Moreover, the present Embodiment 1 is configured such that the switch SW2 can be switched in synchronism with the switches SW3 and SW4, so that the offset voltage can be changed also.

Accordingly, in the present Embodiment 1, through switching of the switches SW2, SW3, and SW4, the first amplification circuit 29 can be switched between a first state ST1 in which a first gain G1 and a first output voltage VIP1 having a first offset voltage OFS1 are obtained, and a third state ST3 in which a third gain G3 and a third output voltage VIP3 having a third offset voltage OFS3 are obtained. This state switching is effected through switching of the switches SW2 to SW4 in an interlocked manner. Specifically, when the first amplification circuit 29 is to be brought into the third state ST3, the switch SW2 is switched to the reference potential OFS3 side, and the switches SW3 and SW4 are turned off. The switches SW3 and SW4 correspond to the claimed changeover means. Meanwhile, when the first amplification circuit 29 is to be brought into the first state ST1, the switch SW2 is switched to the reference potential OFS1 side, and the switches SW3 and SW4 are turned on. Notably, these switches SW2 to SW4 are turned on and off by means of a command input which is input from a communication output terminal CT of the ECU 5 via a communication input terminal CI of the gas sensor control circuit 2 in accordance with a control program executed by the CPU 53 of the ECU 5.

In the first amplification circuit 29 of the present Embodiment 1, the resistances of the resistors R9 to R14, the reference potential V2, and the reference potential V3 are such that R9=R10=60 kΩ, R11=R13=270 kΩ, R12=R14=135 kΩ, OFS1=0.4 V, and OFS3=Z V. Accordingly, when the first amplification circuit 29 is brought into the first state, the gain of the first amplification circuit 29 becomes the first gain G1 (=1.5), and the offset voltage becomes the first offset voltage OFS1 (=2.0 V). Further, when the first amplification circuit 29 is brought into the third state, the gain of the first amplification circuit 29 becomes the third gain G3 (=4.5), and the offset voltage becomes the third offset voltage OFS3 (=0.4 V). Notably, in the present specification, the output signal output from the first amplification circuit 29 via the terminal VIP1/VIP3 will be referred to as follows. The output signal output from the first amplification circuit 29 in the first state ST1 will be referred to as a first output signal VIP1, and the output signal output from the first amplification circuit 29 in the third state ST3 will be referred to as a third output signal VIP3. When the signal output from the first amplification circuit 29 is to be denoted by the same name irrespective of whether the first amplification circuit 29 is in the first or third state, the signal will be referred to as the output signal VIP1-3.

In the air-fuel ratio detection system 1 (gas sensor apparatus 3) of the present Embodiment 1, the first amplification circuit 29 using a single operational amplifier OP3 is configured such that the gain and offset voltage can be changed by use of the switches SW2 to SW4. Therefore, as compared with a case where two amplification circuits which differ in gain and offset voltage are provided in order to obtain the first and third output signals, the number of operation amplifiers can be reduced, whereby the air-fuel ratio detection system 1 can be reduced in circuit size and power consumption, and can be made inexpensive.

In the first amplification circuit 29, the relation between the pump current Ip (A) and the first output signal VIP1 (V) in the first state and the relation between the pump current Ip (A) and the third output signal VIP3 (V) in the third state are represented by the following equations, respectively.

$$VIP1 = Ip \times 300 \times 1.5 + 2.0 \quad \text{Eq. (2)}$$

$$VIP3 = Ip \times 300 \times 4.5 + 0.4 \quad \text{Eq. (3)}$$

Figure 4:
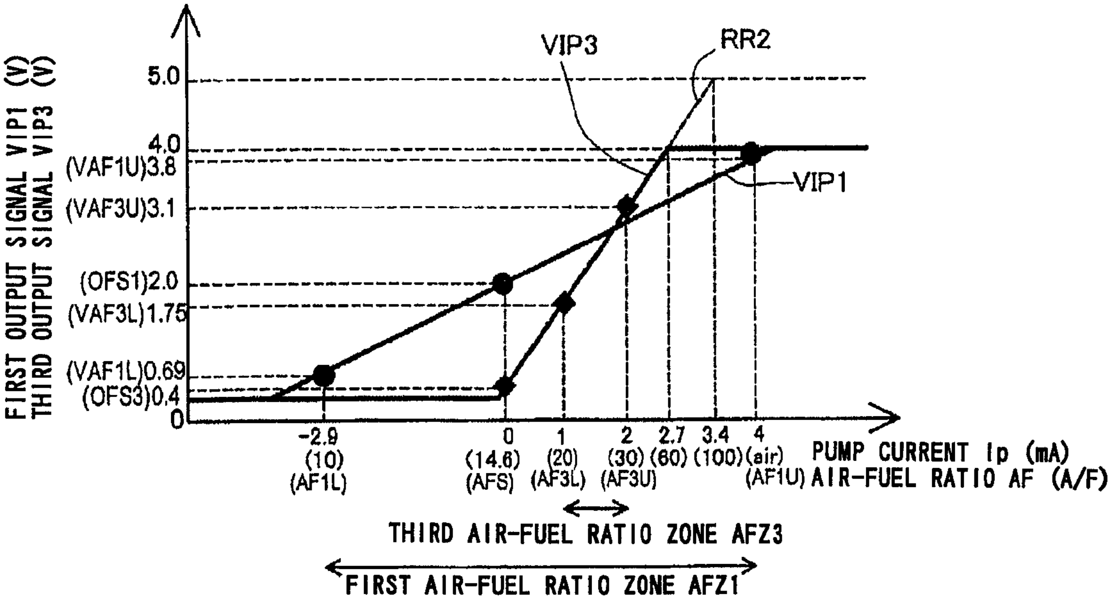
FIG. 4 is a graph relating to a case where the first amplification circuit of a gas sensor control circuit according to Embodiment 1, Modification 1, and Modification 2 is in a first state ST1 or a third state ST3, and showing the relation between pump current Ip or air-fuel ratio AF and first output signal VIP1 and third output signal VIP3.

FIG. 4 shows the output characteristic of the first amplification circuit 29; i.e., the first output signal VIP1 which is output from the first amplification circuit 29 in the first state ST1 and is determined on the basis of Eq. (2), and the third output signal VIP3 which is output from the first amplification circuit 29 in the third state ST3 and is determined on the basis of Eq. (3). In FIG. 4, the horizontal axis represents the pump current Ip (unit: mA) and air-fuel ratio AF (unit: A/F) corresponding thereto. The vertical axis represents the first and third output signals VIP1 and VIP3 (unit: V). Notably, like FIG. 3, the point at which the pump current Ip becomes 0 mA corresponds to the stoichiometric ratio, the left side of the stoichiometric ratio is a rich region, and the right side thereof is a lean region.

Like the characteristic of the second amplification circuit 30 shown in FIG. 3, due to the output characteristic of the operational amplifier OP3 used in the first amplification circuit 29, the output voltage ranges of the first and third output signals VIP1 and VIP3 are each limited to 0.3 to 4.0 V. Therefore, in the graph shown in FIG. 4, each of the first output signal VIP1 and the third output signal VIP3 has a characteristic such that it is clipped at 0.3 V, which is the minimum value of the output voltage, and at 4.0 V, which the maximum value of the output voltage.

First, attention is paid to the first output signal VIP1 in FIG. 4. When the pump current Ip is −2.9 mA corresponding to an air-fuel ratio AF=10, the first output signal VIP1 becomes 0.69 V. Further, when the pump current Ip is 4.0 mA corresponding to an air-fuel ratio AF=infinity (=air), the first output signal VIP-3 becomes 3.8 V. FIG. 4 shows that at least within a range in which the air-fuel ratio AF=10 to infinity (Ip=−2.9 mA to 4.0 mA), the first output signal VIP1 changes linearly with the pump current Ip.

Thus, when the first amplification circuit 29 is brought into the first state, it is possible to obtain the first output signal VIP1 corresponding to air-fuel ratio AF within a range containing a wide first air-fuel ratio zone AFZ1, the lower limit (first lower limit AF1L) of which is an air-fuel ratio AF of 10 within the rich region corresponding to Ip=−2.9 mA and the upper limit (first upper limit AF1U) of which is an air-fuel ratio AF of infinity (=air) within the lean region corresponding to Ip=4.0 mA (see FIG. 4). That is, it is understood that use of the first state of the first amplification circuit 29 allows for obtainment of the first output signal VIP1 which changes with the air-fuel ratio at least within the first air-fuel ratio zone AFZ1.

Further, attention is paid to the third output signal VIP3 in FIG. 4. When the pump current Ip is 1.0 mA corresponding to an air-fuel ratio AF=20, the third output signal VIP3 becomes 1.75 V. Further, when the pump current Ip is 2.0 mA corresponding to an air-fuel ratio AF=30, the first output signal VIP1 becomes 3.1 V. FIG. 4 shows that at least within a range in which the air-fuel ratio AF=20 to 30 (Ip=1.0 mA to 2.0 mA), the third output signal VIP3 changes linearly with the pump current Ip. Thus, when the first amplification circuit 29 is brought into the third state, it is possible to obtain the third output signal VIP3 corresponding to air-fuel ratio AF within a range containing a narrow third air-fuel ratio zone AFZ3, the lower limit (third lower limit AF3L) of which is an air-fuel ratio AF of 20 within the lean region corresponding to Ip=1.0 mA and the upper limit (third upper limit AF3U) of which is an air-fuel ratio AF of 30 within the lean region corresponding to Ip=2.0 mA (see FIG. 4). That is, it is understood that use of the third state of the first amplification circuit 29 allows for obtainment of the third output signal VIP3 which changes with the air-fuel ratio at least within the third air-fuel ratio zone AFZ3. Notably, the third air-fuel ratio zone AFZ3 is contained in the first air-fuel ratio zone AFZ1.

Thus, in the air-fuel ratio detection system 1 (gas sensor apparatus 3) of the present Embodiment 1, the second output signal VIP2 can be obtained from the second amplification circuit 30, and through changeover of the switches SW2 to SW4, the first output signal VIP1 or the third output signal VIP3 can be obtained from the first amplification circuit 29.

The first output signal VIP1 or the third output signal VIP3 obtained in the first amplification circuit 29 is output from the terminal VIP1/VIP3 of the gas sensor control circuit 2 via the buffer 33 and then input to the terminal AD2 of the ECU 5, and is converted into a digital value by means of the A/D converter 52. The digital value is processed by means of the CPU 53, and is utilized for, for example, fuel control of the gasoline engine. Notably, in the present Embodiment 1, the first output signal VIP1 and the third output signal VIP3 are selectively input to the ECU 5.

In the present Embodiment 1, the first air-fuel ratio zone AFZL (AF=10 to infinity (=air)) covers a wide range from the first lower limit AFLL (AF=10) to the first upper limit AFLU (AF=infinity). Meanwhile, the second air-fuel ratio zone AFZ2 (AF=13 to 20) covers a range in the vicinity of the stoichiometric ratio, narrower than the first air-fuel ratio zone AFZ1. The second air-fuel ratio zone AFZ2 ranges from the second lower limit VAF2L (AF=1) located in the rich region and on the stoichiometric ratio side with respect to the first lower limit AF1L to the second upper limit AF2U (AF=20) located in the lean region and on the stoichiometric ratio side with respect to the first upper limit AF1U. Further, the third air-fuel ratio zone AFZ3 (AF=20 to 30) covers a range in the lean region that is narrower than the first air-fuel ratio zone AFZ1. The third air-fuel ratio zone AFZ3 ranges from the third lower limit AF3L (AF=20) equal to the second upper limit AF2U (AF=20) to the third upper limit AF3U (AF=30) between the second upper limit AF2U and the first upper limit AF1U.

Accordingly, from the first output signal VIP1 obtained in the first amplification circuit 29 brought into the first state, air-fuel ratio AF can be detected at least within the first air-fuel ratio zone AFZ1 (AF=10 to infinity (air)). Further, from the second output signal VIP2 obtained in the second amplification circuit 30, air-fuel ratio AF can be detected at least within the second air-fuel ratio zone AFZ2 (A/F=13 to 20). Moreover, from the third output signal VIP3 obtained in the first amplification circuit 29 brought into the third state, air-fuel ratio AF can be detected at least within the third air-fuel ratio zone AFZ3 (A/F=20 to 30).

When the second output voltage VIP2 and the third output voltage VIP3 are obtained, the detection voltage Vd is amplified with the second gain G2 and third gain G3 (G2=G3=4.5), which are higher than the first gain G1 (G1=1.5), which is used to amplify the detection voltage Vd so as to obtain the first output voltage VIP1. Accordingly, in the case where the ECU 5 obtains air-fuel ratio AF from the second output voltage VIP2 or the third output voltage VIP3, the ratio of a change in the output signal value to a unit change in the detection signal Vd is large as compared with the case where air-fuel ratio AF is obtained from the first output signal VIP1. Accordingly, the ratio of a change in the output signal to a change in the air-fuel ratio AF can be increased. Therefore, use of the second output voltage VIP2 or the third output voltage VIP3 enables the air-fuel ratio to be detected more accurately in the second air-fuel ratio zone AFZ2 in the vicinity of the stoichiometric ratio and the third air-fuel ratio zone AFZ3 in the lean region.

In addition, the second upper limit AF2U and the third lower limit AF3L are made equal to each other (AF=20). That is, the second air-fuel ratio zone AFZ2 is continued to the third air-fuel ratio zone AFZ3. Accordingly, within a range from the second lower limit AF2L (AF=13) to the third upper limit AF3U (AF=30), air-fuel ratio can be detected continuously by use of at least one of the second output signal VIP2 and the third output signal VIP3. That is, air-fuel ratio can be detected continuously within a range of AF=13 to 30; i.e., from a ratio within the rich region and close to the stoichiometric ratio to a ratio within the lean region and on the stoichiometric ratio side of the first upper limit (AF=infinity).

Thus, in the air-fuel ratio detection system 1 (gas sensor apparatus 3) of the present Embodiment 1, through use of at least one of the second output voltage VIP2 and the third output voltage VIP3, air-fuel ratio at least in the second air-fuel ratio zone AFZ2 and the third air-fuel ratio zone AFZ3 can be detected accurately. Therefore, proper control can be performed through accurate detection of air-fuel ratio in all of the case of stoichiometric burn control, the case of lean burn control, and the case where control shifts from the stoichiometric burn control to the lean burn control.

Further, air-fuel ratio can be detected within a wide air-fuel ratio range (first air-fuel ratio zone AFZ1) by use of the first output signal VIP1 only. Accordingly, air-fuel ratio can be detected properly even when burning in the rich region occurs, for example, during acceleration of an automobile or even when the air-fuel ratio greatly changes before and after occurrence of burning in the rich region. As described above, in the air-fuel ratio detection system 1 (gas sensor apparatus 3) of the present Embodiment 1, air-fuel ratio AF can be properly obtained in each of various burn controls such as stoichiometric burn control, lean burn control, and burn control in the rich region.

Figure 5:
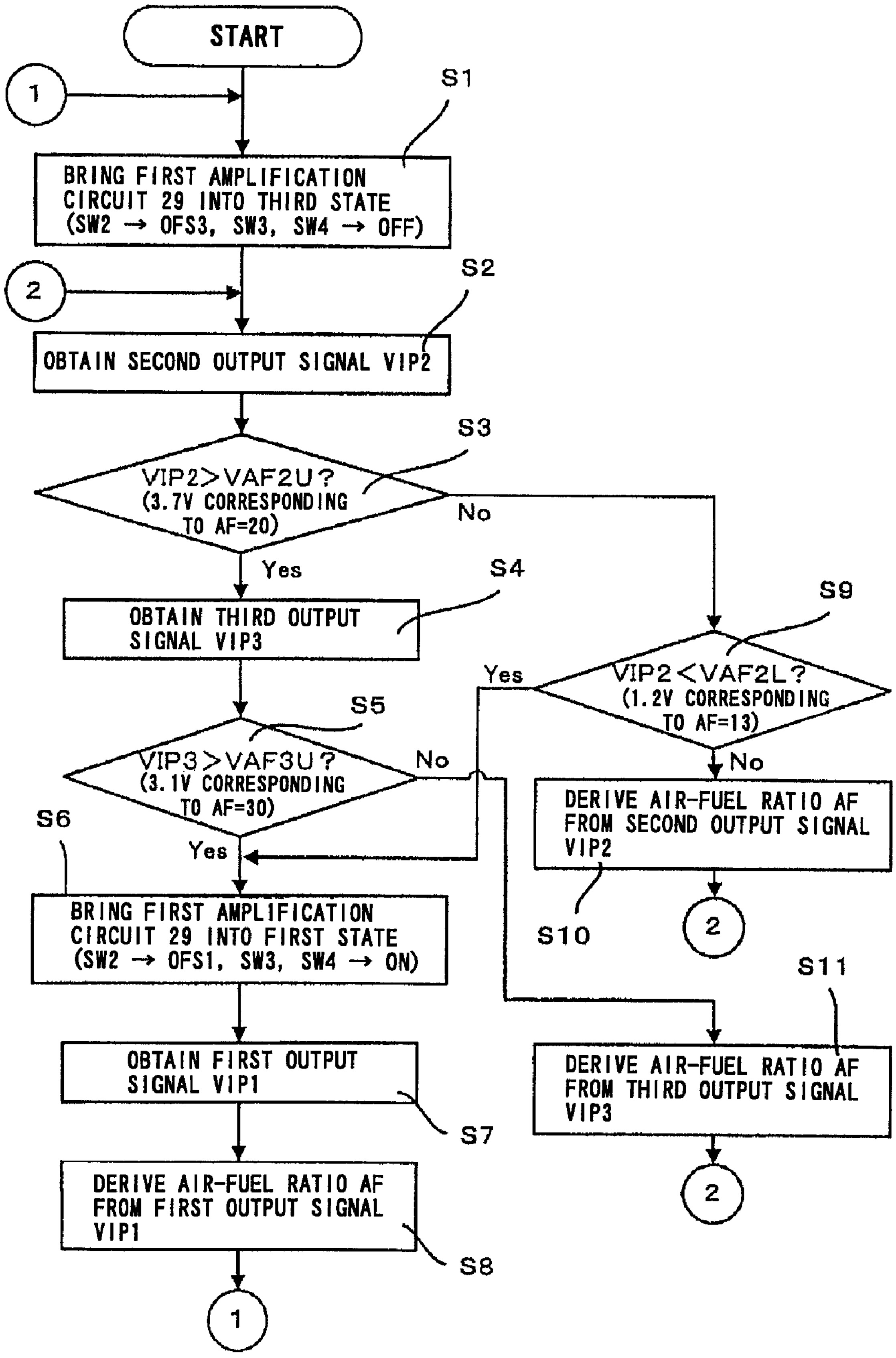
FIG. 5 is a flowchart showing specific steps of an air-fuel ratio detection method employed by the air-fuel ratio detection system according to Embodiment 1.

Next, with reference to FIG. 5, there will be described the specific steps of an air-fuel ratio detection method performed by the air-fuel ratio detection system 1 (gas sensor apparatus 3) of the present Embodiment 1.

First, in step 51, the CPU switches the switch SW2 to the reference potential OFS3 side and turns the switches SW3 and SW4 off, so that the gain and offset voltage of the first amplification circuit 29 are set to the third gain G3 (in the present embodiment, G3=4.5) and the third offset voltage OFS3 (in the present embodiment, OFS3=0.4 V). That is, the first amplification circuit 29 is brought into the third state.

Next, in step 52, the CPU obtains the second output signal VIP2 output from the second amplification circuit 30. Specifically, the CPU fetches a digital value of the voltage of the second output signal VIP2 converted by means of the A/D converter 51 in the ECU 5.

Further, in step 53, the CPU determines whether or not the second output signal VIP2 obtained in step 52 is greater than a second upper limit voltage VAF2U (in the present example, 3.7 V) corresponding to the second upper limit AF2U. Specifically, this determination is performed through comparison between the second upper limit voltage VAF2U and the digital value of the voltage of the second output signal VIP2 fetched in the ECU 5 in step 51. When the result of the comparison shows that the second output signal VIP2 is greater than the second upper limit voltage VAF2U (Yes), the CPU proceeds to step 54. If not (No), the CPU determines that the second output signal VIP2 is equal to or less than the second upper limit voltage VAF2U, and proceeds to step 59.

In step 59, the CPU determines whether or not the second output signal VIP2 obtained in step 52 is less than a second lower limit voltage VAF2L (in the present example, 1.2 V) corresponding to the second lower limit AF2L. The specific steps of the determination are similar to those of the determination in step 53. When the result of the comparison shows that the second output signal VIP2 is less than the second lower limit voltage VAF2L (Yes), the CPU proceeds to step 56. If not (No), the CPU determines that the second output signal VIP2 assumes a value which is equal to or greater than the second lower limit voltage VAF2L and which corresponds to an air-fuel ratio within the second air-fuel ratio zone AFZ2, and then proceeds to step 510.

In step 510, the CPU calculates the air-fuel ratio AF in accordance with Eq. (1) and by use of the second output signal VIP2 in the ECU 5. After completion of the calculation of the air-fuel ratio AF, the CPU returns to step 52.

Meanwhile, in step 54, the CPU obtains the third output signal VIP3 output from the first amplification circuit 29 in the third state. Specifically, the CPU fetches a digital value of the voltage of the third output signal VIP3 converted by means of the A/D converter 52 in the ECU 5. Further, in step 55, the CPU determines whether or not the third output signal VIP3 obtained in step 54 is greater than a third upper limit voltage VAF3U (in the present example, 3.1 V) corresponding to the third upper limit AF3U. Specifically, this determination is performed through comparison between the third upper limit voltage VAF3U and the digital value of the voltage of the third output signal VIP3 fetched in the ECU 5 in step 54. When the result of the comparison shows that the third output signal VIP3 is greater than the third upper limit voltage VAF3U (Yes), the CPU proceeds to step 56. If not (No), the CPU determines that the third output signal VIP3 assumes a value which is equal to or less than the third upper limit voltage VAF3U and corresponds to an air-fuel ratio within the third air-fuel ratio zone AFZ3, and then proceeds to step 511. In step 511, the CPU calculates the air-fuel ratio AF in accordance with Eq. (3) and by use of the third output signal VIP3 in the ECU 5. After completion of the calculation of the air-fuel ratio AF, the CPU returns to step 52.

Meanwhile, steps 56 to 58 are performed when the second output signal VIP2 obtained in step 52 or the third output signal VIP3 obtained in step 54 shows that the air-fuel ratio AF is contained in neither the second air-fuel ratio zone AFZ2 nor the third air-fuel ratio zone AFZ3. In these steps, the air-fuel ratio is detected by use of the first output signal VIP1 corresponding to the widest first air-fuel ratio zone AFZ1.

First, in step 56, the CPU switches the switch SW2 to the reference potential OFS1 side and turns the switches SW3 and SW4 on, so that the gain and offset voltage of the first amplification circuit 29 are set to the first gain G1 (in the present embodiment, G1=1.5) and the first offset voltage OFS1 (in the present embodiment, OFS1=2.0 V). That is, the first amplification circuit 29 is brought into the first state.

Subsequently, in step 57, the CPU obtains the first output signal VIP1 output from the first amplification circuit 29 in the first state. Specific steps are similar to those in step 54. Finally, in step 58, the CPU calculates the air-fuel ratio AF in accordance with Eq. (2) and by use of the first output signal VIP1 in the ECU 5. After completion of the calculation of the air-fuel ratio AF, the CPU returns to step 51, in which the first amplification circuit 29 is brought into the third state.

By virtue of the above-described steps, when the air-fuel ratio AF to be detected is contained in the second air-fuel ratio zone AFZ2, the air-fuel ratio AF is calculated on the basis of the second output signal VIP2 output from the second amplification circuit 30. Further, when the air-fuel ratio AF to be detected is contained in the third air-fuel ratio zone AFZ3, the air-fuel ratio AF is calculated on the basis of the third output signal VIP3 output from the first amplification circuit 29 in the third state. Notably, in the case where the air-fuel ratio AF is detected continuously and the fuel ratio AF to be detected is contained in the second air-fuel ratio zone AFZ2 or the third air-fuel ratio zone AFZ3, the first amplification circuit 29 operates while remaining in the third state ST3. That is, in this case, the processing (step 56 or 51) for switching the first amplification circuit 29 between the first and third states is not performed, and the air-fuel ratio AF can be detected with high responsiveness.

(Modification 1) Next, an air-fuel ratio detection system 100 according to a first modification of Embodiment 1 will be described with reference to FIG. 6.

In the present Modification 1, a circuit similar to the detection section 20 of the gas sensor control circuit 2 used in Embodiment 1 is applied to detection of air-fuel ratio performed by use of a known one-cell-type gas sensor element 120. Accordingly, descriptions of the detection section 20 similar to those in Embodiment 1 will not be repeated or will be simplified, and different portions will be described.

Figure 6:
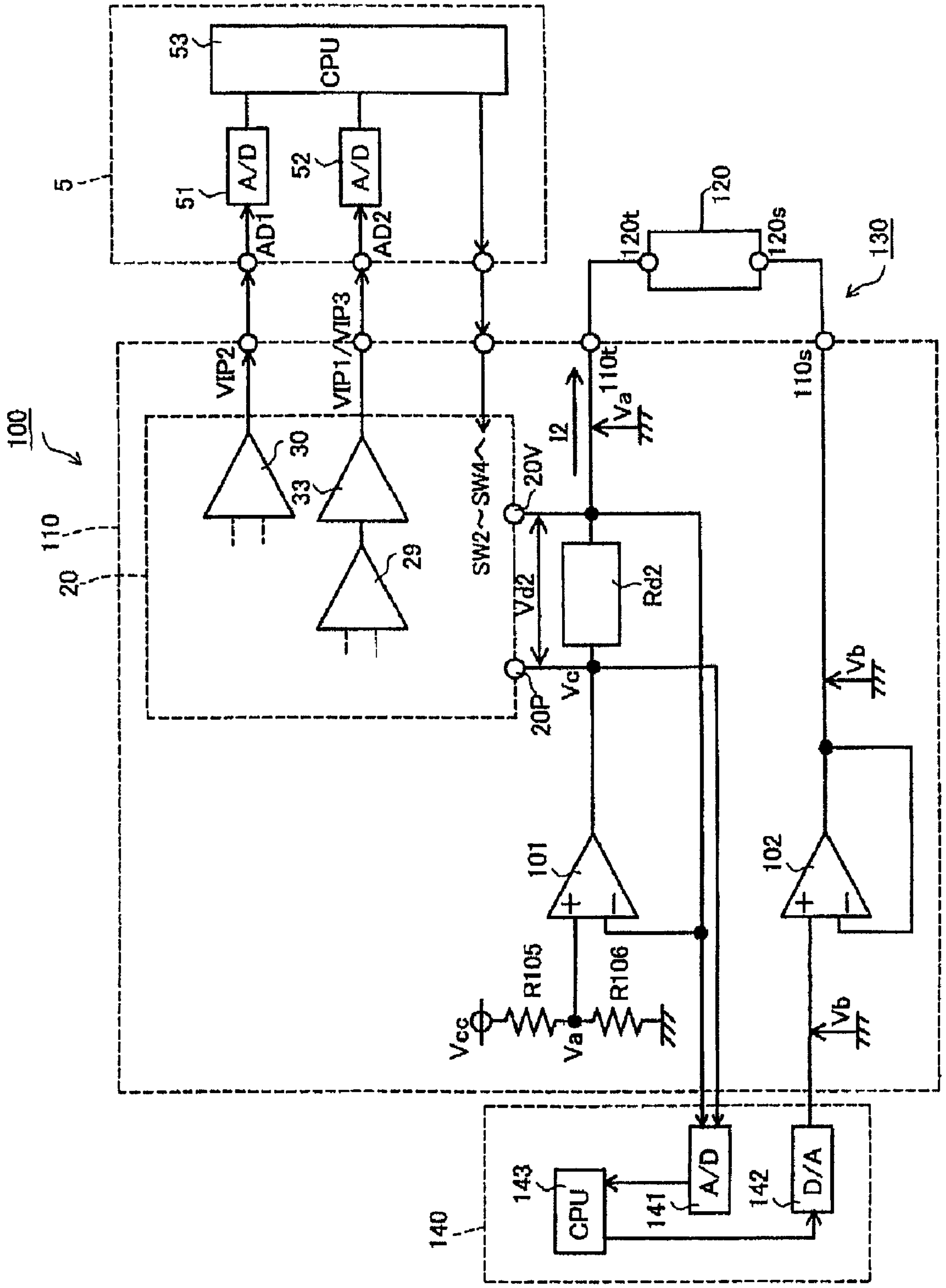
FIG. 6 is a circuit diagram for describing the circuit configuration of the gas sensor control circuit and the air-fuel ratio detection system according to Modification 1.

The air-fuel ratio detection system 100 shown in FIG. 6 includes a gas sensor apparatus 130 and an ECU 5 similar to that used in Embodiment 1. The gas sensor apparatus 130 includes a gas sensor element 120; a gas sensor control circuit 110 which controls voltage applied to the gas sensor element 120 and includes a detection section 20 similar to that used in Embodiment 1; and a control computer 140 for controlling the gas sensor control circuit 110. The ECU 5 obtains air-fuel ratio AF on the basis of an output signal of the gas sensor control circuit 110.

The one-cell-type gas sensor element 120 includes an oxygen-ion conductive solid electrolyte body having the shape of a bottomed cylinder, and Pt electrode layers formed on the inner and outer surfaces of the solid electrolyte body. A porous diffusion resistance layer is formed on the electrode located on the outer side. In a region on the lean side of the stoichiometric air-fuel ratio, the gas sensor element 120 generates a limiting current (sensor current I2) corresponding to the oxygen concentration of exhaust gas, upon application of voltage, which application is commanded from the control computer 140. Further, in a region on the rich side of the stoichiometric air-fuel ratio, the concentrations of unburned gases, such as carbon monoxide and hydrocarbon, change approximately linearly, and the gas sensor element 120 generates a limiting current (sensor current I2) corresponding to the concentrations of CO, HC, etc. Notably, the respective electrode layers are connected to external connection terminals 120*t* and 120*s*. Further, these external connection terminals 120*t* and 120*s* are connected to gas sensor control terminals 110*t* and 110*s* of the gas sensor control circuit 110.

The gas sensor control circuit 110 includes resistors R105 and R106 for dividing a power supply voltage Vcc to thereby generate a reference voltage Va; operational amplifiers 101 and 102; and a detection resistor Rd2. The reference voltage Va generated by the resistors R105 and R106 is applied to a non-inverted input terminal of the operational amplifier 101, and the output terminal of the operational amplifier 101 is connected to the gas sensor control terminal 110*t* via the detection resistor Rd2. Further, an inverted input terminal of the operational amplifier 101 is connected to the gas sensor control terminal 110*t*. Therefore, the potential of the gas sensor control terminal 110*t* is controlled such that it becomes equal to the reference voltage Va.

The control computer 140 includes not only a CPU 143 but also an A/D converter 141 and a D/A converter 142. The CPU 143 fetches a voltage (potential difference) Vd2 across the detection resistor Rd2 via the A/D converter 141, and detects the sensor current I2 flowing through the gas sensor element 120 from this potential difference Vd2. The CPU 143 then calculates an optimal voltage command value to be applied to the gas sensor element 120 in accordance with the sensor current I2. The voltage command value calculated by the CPU 143 is converted to a command voltage Vb at the D/A converter 142, and the command voltage Vb is input to the operational amplifier 102.

The output of the D/A converter 142 is input to a non-inverted input terminal of the operational amplifier 102, and the output of the operational amplifier 102 is input to an inverted input terminal thereof. Therefore, this operational amplifier 102 operates as a buffer. Accordingly, the command voltage Vb is applied to the external connection terminal 120*s* of the gas sensor element 120 via the gas sensor control terminal 110*s*.

By virtue of the above-described configuration, at the time of air-fuel ratio detection, the reference voltage Va is applied to the external connection terminal 120*t* of the gas sensor element 120, and the command voltage Vb is applied to the external connection terminal 120*s* thereof. Further, the current I2 flowing through the gas sensor element 120 can be detected as a potential difference Vd2 (Vc−Va) across the detection resistor Rd2. Notably, the reference voltage Va and the command voltage Vb are controlled such that when the detected air-fuel ratio AF is 14.6 (stoichiometric ratio), the sensor current I2 becomes 0 (mA).

In the air-fuel ratio detection system 100 (gas sensor apparatus 130) according to the present Modification 1, the detection section 20 similar to that used in the air-fuel ratio detection system 1 (gas sensor apparatus 3) according to Embodiment 1 is connected so as to detect the potential difference (detection voltage) Vd2 across the detection resistor Rd2 via an intermediate terminals 20P and 20V. Accordingly, as in Embodiment 1, the first gain G1, the second gain G2, the third gain G3, the first offset voltage OFS1, the second offset voltage OFS2, and the third offset voltage OFS3 are set in accordance with the characteristic (detection signal) of the gas sensor element 120.

That is, in the present Modification 1 as well, through use of the first output signal VIP1 from the first amplification circuit 29 in the first state, the air-fuel ratio AF can be detected at least within the wide first air-fuel ratio zone AFZ1. Further, through use of the second output voltage VIP2 from the second amplification circuit 30, the air-fuel ratio AF can be accurately detected at least within the narrow second air-fuel ratio zone AFZ2 near the stoichiometric ratio. Moreover, through use of the third output signal VIP3 from the first amplification circuit 29 in the third state, the air-fuel ratio AF can be accurately detected at least within the narrow third air-fuel ratio zone AFZ3 in the lean region (see FIGS. 1 and 2). Accordingly, as in Embodiment 1, the present Modification 1 enables the air-fuel ratio to be detected with proper accuracy in accordance with a range in which the air-fuel ratio AF is measured.

Figure 7:
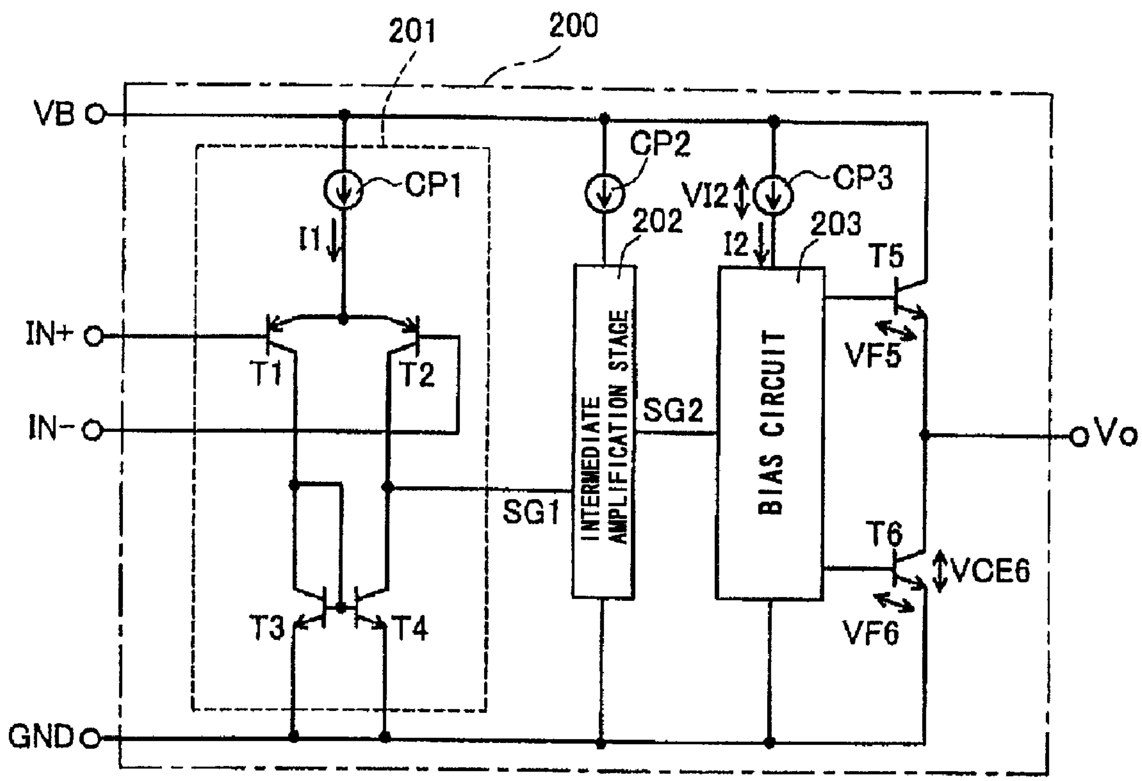
FIG. 7 is an equivalent circuit diagram for describing a rail-to-rail type operational amplifier used in the gas sensor control circuit according to Modification 2.

(Modification 2) Next, an air-fuel ratio detection system according to a second modification of Embodiment 1 will be described with reference to FIGS. 3, 4, and 7.

The air-fuel ratio detection system (gas sensor apparatus) of the present Modification 2 differs in that in place of an operational amplifier having an ordinary output-stage circuit configuration, an operational amplifier 200 (see FIG. 7) having a rail-to-rail type output stage is used for the operational amplifiers OP3, OP5, and OP7 used in the first amplification circuit 29, the second amplification circuit 30, and the buffer 33 (see FIG. 1). Accordingly, in the present Modification 2, only different portions will be described, and descriptions of the same portions will not be repeated or will be simplified.

First, the rail-to-rail type operational amplifier 200 will be described with reference to the equivalent circuit of FIG. 7. This operational amplifier 200 is connected at its positive-side power supply terminal to a battery power supply, and operates at the power supply voltage VB (12 V); i.e., operates with a single power supply. This operational amplifier 200 includes an input stage circuit 201, an intermediate amplification stage circuit 202, a constant-current circuit CP2 for supplying current to the intermediate amplification stage circuit 202, a bias circuit 203, a constant-current circuit CP3 for supplying current to the bias circuit 203, and an output stage circuit composed of NPN transistors T5 and T6 connected to an output terminal Vo.

The input stage circuit 201 has a circuit configuration similar to that of an ordinary operational amplifier circuit, and includes a pair of PNP transistors T1 and T2, a constant-current circuit CP1 connected to the emitter terminals of these transistors, and a pair of NPN transistors T3 and T4 connected to the collector terminals of the PNP transistors T1 and T2. Further, input signals IN+ and IN− are input to the bases of the NPN transistors T3 and T4 of the input stage circuit 201.

In the input stage circuit 201, the PNP transistors T1 and T2 are driven by means of a constant current I1 of the constant-current circuit CP1, and collector currents of the PNP transistors T1 and T2 change in accordance with the voltage difference between the input signals IN+ and IN−. Further, with changes in the collector currents of the PNP transistors T1 and T2, the NPN transistors T3 and T4 operate as follows. That is, when the voltages of the input signals IN+ and IN− satisfy a relation IN+>IN−, the collector current of the PNP transistor T2 increases, and the collector voltage of the NPN transistor T4 increases. Meanwhile, when IN+<IN−, the collector current of the PNP transistor T1 increases, and base currents of the NPN transistors T3 and T4 flow. As a result, the NPN transistors T3 and T4 become ON, and the collector voltage of the NPN transistor T4 decreases.

The collector voltage of the NPN transistor T4 is transmitted to the intermediate amplification stage circuit 202 as a signal SG1, and amplified by the intermediate amplification stage circuit 202. The amplified signal SG1 is transmitted to the bias circuit 203 as a signal SG2. The bias circuit 203 is driven by means of a constant current I2 from the constant-current circuit CP3, and operates the NPN transistors T5 and T6 in accordance with the signal SG2 so that a signal is output from the output terminal Vo. When the voltages of the input signals IN+ and IN−satisfy a relation IN+>IN−, the bias circuit 203 turns the NPN transistor T5 on and turns the NPN transistor T6 off so as to increase the output voltage at the output terminal Vo. Meanwhile, when IN+<IN−, the bias circuit 203 turns the NPN transistor T5 off and turns the NPN transistor T6 on so as to decrease the output voltage at the output terminal Vo.

Next, the ranges of output voltages of the NPN transistors T5 and T6 at the output stage will be considered.

First, the NPN transistor T5 at the output stage operates when a portion of the constant current I2 flowing out of the constant-current circuit CP3, to which the power supply voltage VB is applied, flows to the base of the NPN transistor T5 as base current. Accordingly, due to restriction imposed by a drop voltage V12 at the constant-current circuit CP3 and a base-emitter voltage VF2 of the NPN transistor T5, the maximum output voltage Vmax which this operational amplifier can output from the terminal Vo is determined such that Vmax=VB−VI2−VFS. Specifically, when VB=12 V, VI2=0.6 V, and VFS=0.7 V, Vmax=12−0.6−0.7=10.7 V. That is, the maximum output voltage Vmax at the output terminal Vo is 10.7 V.

Meanwhile, the NPN transistor T6 at the output stage operates when base current is supplied from the bias circuit 203. Accordingly, no restriction is imposed by a base-emitter voltage VF6 of the NPN transistor T6. Since a collector-emitter voltage VCE6 is generated, the minimum output voltage Vmin which this operational amplifier can output from the terminal Vo is limited by this collector-emitter voltage VCE6. That is, the minimum output voltage Vmin of the output terminal Vo becomes equal to the collector-emitter voltage VCE6. Specifically, when VCE6=0.4 V, the minimum output voltage Vmin of the output terminal Vo becomes 0.4 V.

As can be understood from above, the range of output voltage at the output terminal Vo becomes 0.4 V to 10.7 V. However, since the input voltage range of the A/D converters 51 and 52 is 0 V to 5 V, the substantial operational range of the operational amplifier 200 for detection of air-fuel ratio AF becomes 0.4 V to 5.0 V. Accordingly, in the rail-to-rail type operational amplifier 200, the output range is expanded on the maximum output voltage side, as compared with the output range of an ordinary operational amplifier (0.4 V to 4.0 V).

Next, there will be described an operation in a case where the rail-to-rail type operational amplifier 200 is used for the operational amplifiers OP3, OP5, and OP7 of the first amplification circuit 29, the second amplification circuit 30, and the buffer 33.

First, the output voltage characteristic in the case where the rail-to-rail type operational amplifier 200 is used for the operational amplifier OP5 of the second amplification circuit 30 is shown by a broken line PR1 in FIG. 3. In the case where an operation amplifier having an ordinary output-stage configuration is used for the operational amplifier OP5 of the second amplification circuit 30, its maximum output voltage becomes 4.0 V, so that the maximum value of the detectable pump current Ip is 1.3 mA (corresponding to an air-fuel ratio AF of 22). In contrast, in the case where the rail-to-rail type operational amplifier 200 is used for the operational amplifier OP5, the maximum output voltage is increased to 5.0 V, whereby the maximum value of the detectable pump current Ip can be increased to 2.0 mA (corresponding to an air-fuel ratio AF of 30).

Further, the output voltage characteristic associated with the third output signal VIP3 in the case where the rail-to-rail type operational amplifier 200 is used for the operational amplifier OP3 of the first amplification circuit 29 is shown by a broken line PR2 in FIG. 4. This broken line PR2 shows the characteristic of the first amplification circuit 29 when it is in the third state. The characteristic of the first amplification circuit 29 when it is in the first state is the same as that in the case where an ordinary operational amplifier is used, because 4.0 mA (AF=infinity (air)), which is the maximum value of the pump current Ip, is reached, even when an ordinary operational amplifier is used.

In the case where an operation amplifier having an ordinary output-stage configuration is used in the first amplification circuit 29 so as to obtain the third output signal VIP3, the maximum output voltage becomes 4.0 V, so that the maximum value of the detectable pump current Ip is 2.7 mA (corresponding to an air-fuel ratio AF of 60). In contrast, in the case where the rail-to-rail type operational amplifier 200 is used for the operational amplifier OP3, the maximum output voltage is increased to 5.0 V, whereby the maximum value of the detectable pump current Ip can be increased to 3.4 mA (corresponding to an air-fuel ratio AF of 100).

Further, when the rail-to-rail type operational amplifier 200 is used for the operational amplifier OP7 of the buffer 33, the third output signal of the first amplification circuit 29 having a detection range expanded as described above can be output as is.

By virtue of the above-described configuration, in the air-fuel ratio detection system (gas sensor apparatus) according to Modification 2 in which the rail-to-rail type operational amplifier 200 is applied to the amplifiers used in the first amplification circuit 29, the second amplification circuit 30, and the buffer 33, the first output signal VIP1, the second output signal VIP2, and the third output signal VIP3, which change in accordance with the detection signal of the gas sensor, can be output in a wider detection range.

Notably, in the present Modification 2, for the second amplification circuit 30, there is exemplified a case in which the range in which the pump current Ip can be detected from the second output signal VIP2 is expanded under the conditions where the gain and offset voltage are set to the second gain G2 (in the present example, G2=4.5) and the second offset voltage OFS2 (in the present example, OFS2=2.3 V), respectively, as in the case of Embodiment 1, in which a rail-to-rail type operational amplifier is not used. In contrast, when the range in which the pump current Ip can be detected from the second output signal VIP2 is unchanged and the second gain G2 is increased, the pump current Ip (air-fuel ratio AF) can be detected with higher accuracy. Notably, in the above-described modification, the rail-to-rail type operational amplifier 200 is used in the second amplification circuit 30. However, similar operation and effects can be attained even when the rail-to-rail type operational amplifier 200 is used in the first amplification circuit 29.

In the above, the present invention has been described with reference to Embodiment 1, Modification 1, and Modification 2. However, the present invention is not limited to the embodiment and modifications, and may be practiced with proper changes without departing from the gist of the invention.

For example, Embodiment 1 and Modification 2 exemplify the air-fuel ratio detection system 1 which includes the gas sensor control circuit 2 using a two-cell-type gas sensor element, and Modification 1 exemplifies the air-fuel ratio detection system 100 which includes the gas sensor control circuit 110 using a one-cell-type gas sensor element. However, the present invention can be applied to a gas sensor control circuit using a gas sensor element of another form (e.g., a gas sensor element including three or more cells).

Further, the means for converting a change in current flowing through a cell to a change in voltage is not limited to a detection resistor, and it may be means for detecting induction current, for example.

Moreover, Modification 2 exemplifies the case where the rail-to-rail type operational amplifier is formed by use of bipolar elements (PNP transistors and NPN transistors). However, semiconductor elements which can operate similarly, such as MOSFETs and gallium arsenide transistor elements may be used.

This application is based on Japanese Patent Application No. JP 2005-92349 filed Mar. 28, 2005, incorporated herein by reference in its entirety.

What is claimed is:

1. A sensor control apparatus for outputting a detection signal that changes in accordance with an air-fuel ratio while making use of exhaust gas of an internal combustion engine, the sensor control apparatus comprising:

an amplification circuit which can be selectively brought into a first state and a second state through switching of a gain of the amplification circuit itself; and a current detection resistor which has a predetermined resistance and detects current flowing through the gas sensor element, wherein in the first state, the amplification circuit amplifies the detection signal with a relatively small gain and outputs a first output signal which changes in accordance with the detection signal corresponding to an air-fuel ratio within a relatively wide first air-fuel ratio zone;

in the second state, the amplification circuit amplifies the detection signal with a relatively large gain and outputs a second output signal which changes in accordance with the detection signal corresponding to an air-fuel ratio within a relatively narrow second air-fuel ratio zone contained in the first air-fuel ratio zone, a voltage generated across the current detection resistor is used as the detection signal, and the amplification circuit is a differential amplification circuit which performs differential amplification of potentials at opposite ends of the current detection resistor.

2. A sensor control apparatus according to claim 1, wherein the gas sensor element includes:

an electromotive force cell; and a pump cell which is layered on the electromotive force cell via a measurement chamber into which the exhaust gas can be introduced, the pump cell pumping out and in oxygen within the measurement chamber in accordance with pump current, wherein the pump current supplied to the pump cell via the current detection resistor is controlled such that a predetermined voltage is generated at the electromotive force cell.

3. A sensor control apparatus according to claim 1, wherein the second air-fuel ratio zone is set such that it contains a stoichiometric air-fuel ratio.

4. A sensor control apparatus according to claim 1, wherein the amplification circuit is configured to obtain an output by use of a rail-to-rail type operational amplifier.

5. An air-fuel ratio detection apparatus comprising:

a gas sensor element which outputs a detection signal that changes in accordance with air-fuel ratio while making use of exhaust gas of an internal combustion engine; and a sensor control apparatus according to claim 1, wherein the air-fuel ratio is detected on the basis of an output signal from the sensor control apparatus.

6. A sensor control apparatus for controlling a gas sensor element which generates a detection signal that changes in accordance with air-fuel ratio while making use of exhaust gas of an internal combustion engine, the sensor control apparatus comprising output means, wherein, as ranges for air-fuel ratio, first, second, and third zones are defined, the first zone ranging from a first lower limit within a rich region to a first upper limit in a lean region, the second zone ranging from a second lower limit in the rich region, the second lower limit being located between the first lower limit and a stoichiometric air-fuel ratio, to a second upper limit in the lean region, the second upper limit being located between the first upper limit and the stoichiometric air-fuel ratio, and the third zone ranging from a third lower limit in the lean region, the third lower limit being equal to the second upper limit or being located between the second upper limit and the stoichiometric air-fuel ratio, to a third upper limit between the second upper limit and the first upper limit, and wherein the output means outputs first, second, and third output signals, the first output signal changes in accordance with the detection signal corresponding to an air-fuel ratio at least within the first range, the second output signal changes in accordance with the detection signal corresponding to an air-fuel ratio at least within the second range, the second output signal changing to a greater degree than the first output signal in response to a change in the detection signal, and the third output signal changes in accordance with the detection signal corresponding to an air-fuel ratio at least within the third range, the third output signal changing to a greater degree than the first output signal in response to a change in the detection signal, wherein the output means includes:

a first amplification circuit which is selectively brought into one of a first state in which the first amplification circuit amplifies the detection signal with a first gain and outputs the first output signal and a third state in which the first amplification circuit amplifies the detection signal with a third gain greater than the first gain and outputs the third output signal;

a second amplification circuit which amplifies the detection signal with a second gain greater than the first gain and outputs the second output signal, and the first amplification circuit comprises changeover means for switching a gain of the first amplification circuit, by changing a resistance of a feedback resistor, to one of the first and third gains.

7. A sensor control apparatus according to claim 6, wherein at least one of the first and second amplification circuits is configured to obtain an output by use of a rail-to-rail type operational amplifier.

8. An air-fuel ratio detection apparatus comprising:

a gas sensor element which outputs a detection signal that changes in accordance with air-fuel ratio while making use of exhaust gas of an internal combustion engine; and a sensor control apparatus according to claim 6, wherein the air-fuel ratio is detected on the basis of an output signal from the sensor control apparatus.

9. A sensor control apparatus for outputting a detection signal that changes in accordance with an air-fuel ratio while making use of exhaust gas of an internal combustion engine, the sensor control apparatus comprising:

an amplification circuit which can be selectively brought into a first state and a second state through switching of a gain of the amplification circuit by changing a resistance of a feedback resistor; and a current detection resistor which has a predetermined resistance and detects current flowing through the gas sensor element, wherein in the first state, the amplification circuit amplifies the detection signal with a relatively small gain and outputs a first output signal which changes in accordance with the detection signal corresponding to an air-fuel ratio within a relatively wide first air-fuel ratio zone;

in the second state, the amplification circuit amplifies the detection signal with a relatively large gain and outputs a second output signal which changes in accordance with the detection signal corresponding to an air-fuel ratio within a relatively narrow second air-fuel ratio zone contained in the first air-fuel ratio zone, and a voltage generated across the current detection resistor is used as the detection signal.

* * * * *